United States Patent
Piazza et al.

(10) Patent No.: US 7,395,978 B2
(45) Date of Patent: Jul. 8, 2008

(54) AUTOMATIC FERTILIZING APPARATUS

(76) Inventors: Michael Piazza, 312 Wilbur Ave., Covina, CA (US) 91724; Salvatore Piazza, 1344 Strattford St., Brea, CA (US) 92821

( * ) Notice: Subject to any disclaimer, the term of this patent is extended or adjusted under 35 U.S.C. 154(b) by 631 days.

(21) Appl. No.: 10/891,274

(22) Filed: Jul. 15, 2004

(65) Prior Publication Data

US 2006/0011745 A1 Jan. 19, 2006

(51) Int. Cl.
*B05B 7/30* (2006.01)
(52) U.S. Cl. ............... 239/318; 239/340; 239/581.1; 239/304
(58) Field of Classification Search ............ 239/310, 239/312, 313, 315, 316, 317, 340, 345, 581.1, 239/318, 74, 304
See application file for complete search history.

(56) References Cited

U.S. PATENT DOCUMENTS 2,228,922 A * 1/1941 Gorlick .................. 422/278
2,622,928 A * 12/1952 Misch ..................... 239/226
3,968,932 A * 7/1976 Kimmell .................. 239/142

* cited by examiner

*Primary Examiner*—Christopher S Kim
(74) *Attorney, Agent, or Firm*—Albert O Cota

(57) ABSTRACT

An automatic fertilizing apparatus (10) connected in series with a watering system (150) that includes a water source (152) and a sprinkler head(s) (158). The apparatus (10) consists of a liquid fertilizer container (12) having a water inlet port (20) and a water/fertilizer outlet port (24), and a fertilizing control assembly (50) having an outer fertilizer control tube (52) and an inner fertilizer control tube (82). The tube (52) which includes an outlet fertilizer entry slot (54) is inserted through the port (20) and the port (24) and is fixedly attached therethrough. The tube (82) is rotatably inserted into the tube (52) and includes an inner fertilizer entry slot (84), an inlet end (86) connected to the water source (152), an outlet end (88) connected to the sprinkler head(s) (158) and a vortex tube (87). The vortex tube (87) produces a partial vacuum that allows the fertilizer to be drawn into the two slots (54,84) and enter the water stream from the water source (152), through the two tubes (52,82) and out the sprinkler heads(s) (158).

12 Claims, 8 Drawing Sheets

AUTOMATIC FERTILIZING APPARATUS

TECHNICAL FIELD

The invention pertains generally to home and commercial water sprinkler systems and more particularly to a water sprinkler system that includes an automatic fertilizing apparatus.

BACKGROUND ART

All commercial and residential lawns and plants require watering to survive and grow. Although watering along will be sufficient for certain types of lawns and plants, it has been found that there are many types of lawns and plants that require the additional benefit of a fertilizer. This is especially true for many crops, which have a relatively fast growth period prior to picking or harvesting.

The use of fertilizer has been in existence for a long time. Originally, fertilizer, as with watering, had to be performed by hand. As technology improved, the means by which fertilizer could be applied became more efficient. Today, the most common method of applying fertilizer is to integrate the fertilizer into a water sprinkler system.

The prior art discloses several apparatuses and methods by which a fertilizer can be introduced into the flow of a steam of water that originates form a water source and exits through a sprinkler head into the lawns and plants. These prior art apparatuses and methods which are described infra are relatively complicated, difficult to install and to maintain.

The instant application discloses an automatic fertilizing apparatus that is simple in design and that is easily integrated into an existing watering system.

A search of the prior art did not disclose any literature or patents that read directly on the claims of the instant invention. However, the following U.S. patents are considered related:

| U.S. Pat. No. | INVENTOR | ISSUED |
| --- | --- | --- |
| 6,173,732 | Davis et al | 16 Jan. 2001 |
| 5,823,430 | Clark, Jr. et al | 20 Oct. 1998 |
| 5,730,364 | Gertie | 24 Mar. 1998 |

The U.S. Pat. No. 6,173,732 discloses a chemical feeding system for adding liquid, water soluble solid chemicals to a lawn sprinkler system. The system has one or two vertically oriented mixing chambers containing a removable sponge filter. An effluent tube is attached to the bottom of the mixing chamber for recycling through an adjustable flow metering valve. A drain tube with a shutoff valve and a one-way check valve leads to the main sprinkler system.

The U.S. Pat. No. 5,823,430 discloses an automatic fertilizer system having a liquid fertilizer dispenser. The dispenser introduces a continuous addition of a selected amount of fertilizer, insecticide and herbicide chemicals to sprinklers that use an outside waterline. The dispenser has an adjustable metering cap with different diameter through-holes for allowing the contents of the dispenser to be injected into the flowing stream of water, which leads to the sprinklers.

The U.S. Pat. No. 5,730,364 discloses an automatic fertilizing device installed inline with a below ground water line for an underground sprinkler system. The device consists of a fertilizer tablet chamber that is connected to the inlet and outlet side of the water line. A fertilizer replenishment passage extends upward from the chamber, with an upper end positioned at or below ground level. One or more inlet and outlet screens may be provided at each end of the chamber to prevent the entrance of small particles of the solid fertilizer tablet into either the inlet or outlet line as the tablet is dissolved by the water flow.

For background purposes and as indicative of the art to which the invention relates, reference may be made to following remaining patents found in the search:

| U.S. Pat. No. | INVENTOR | ISSUED |
| --- | --- | --- |
| 5,366,159 | Childers | 22 Nov. 1994 |
| 5,303,503 | Patterson | 19 Apr. 1994 |
| 4,825,959 | Wilhelm | 2 May 1989 |
| 4,056,898 | Brucato et al | 8 Nov. 1977 |
| 3,876,146 | Pacheco | 8 Apr. 1975 |

DISCLOSURE OF THE INVENTION

The automatic fertilizing apparatus (AFA) is designed to function in combination with an existing watering system consisting of a water source connected in series with a water control valve and at least one sprinkler head. The apparatus is installed between the output of the water source and the input of the at least one sprinkler head. In its basic design, the AFA consists of a fertilizer container and a fertilizing control assembly.

The fertilizer container is filled with a liquid fertilizer and includes an upper opening to which is attached a container cap, a first side having a water inlet port, and an opposite second side having a water/fertilizer outlet port.

The fertilizer control assembly consists of an outer fertilizer control tube and an inner fertilizer control tube. The outer fertilizer control tube has an outer fertilizer entry slot, an inlet end and an outlet end that is not attached. The tube is dimensioned to be inserted through the water inlet port with the inlet end fixedly attached to the water inlet port, by an attachment means.

The inner fertilizer control tube has an inner fertilizer entry slot, an inlet end, an outlet end and an internally attached vortex tube. The inlet end is attached to a water line that is connected to the water source, and the outlet end is connected through a water line to the at least one sprinkler head. The tube is dimensioned to rotatably fit into the outer fertilizer control tube. When the inner fertilizer control tube is rotated so that the outer and inner fertilizer entry slots are in alignment, a maximum flow of liquid fertilizer passes from the fertilizer container, enters through the two entry slots, mixes with the flowing stream of water passing from the water source into the inlet end, and exits through the outlet end into the water line attached to the at least one sprinkler head.

The vortex tube is internally positioned to overlap a portion of the inner fertilizer entry slot. When a steam of water flows through the inner fertilizer control tube, the water also flows around and through the vortex tube, which functions as an aspirator that produces a negative pressure. The negative pressure or partial vacuum causes the liquid fertilizer in the fertilizer container to be drawn through the outer and inner fertilizer entry slots and into the flowing stream of water.

To further enhance the design of the AFA, the inlet end of the inner fertilizer control tube can be attached to an inlet locknut, a back flow control valve, and a rotating union that is attached to the water line connected to the water source. Likewise, the outlet end of the inner fertilizer control tube can be attached to an outlet locknut and a sprinkler tube adapter nut that is attached to the water line connected to the at least one sprinkler head. Additionally, a control knob can be attached between the inlet locknut and the back flow control valve. The knob allows the inner fertilizer control tube to be easily grasped and rotated to a selectable position.

In view of the above disclosure, the primary object of the invention is to produce an AFA that allows a commercial or residential lawn and garden to be automatically sprayed with a selectable quantity of liquid fertilizer. In addition to the primary object it is also an object the invention to produce an AFA that:

can be used with either liquid or 100% water soluble solid chemical including fertilizer, insecticide or a herbicide,
is easily maintained, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the automatic fertilizing apparatus is presented in terms of a preferred embodiment that is designed to automatically fertilize a lawn or garden when an installed sprinkler system is turned on. The preferred embodiment of the automatic fertilizing apparatus (hereinafter "AFA 10"), is shown in FIGS. 1-9, and is comprised of three major elements: at least one fertilizer container 12, a container cap 36 and a fertilizing control assembly 50. All the elements that comprise the AFA 10 can be manufactured from a plastic or a metal with a plastic such as polyvinylchloride (PVC) preferred. Also, the attachment means 64 referred to herein is comprised of an adhesive.

Figure 1:
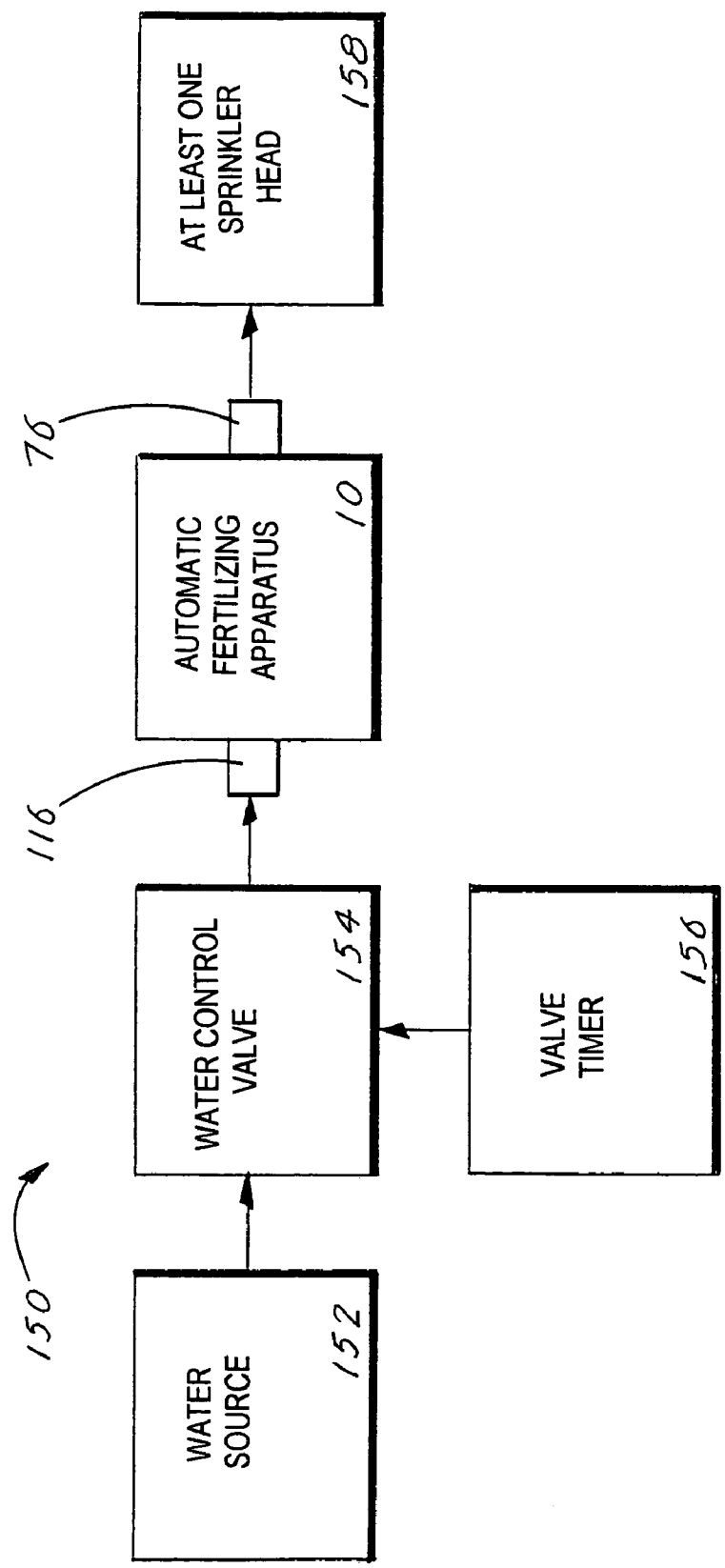
FIG. 1 is a block diagram of a typical water sprinkler system that includes an automatic fertilizing apparatus (AFA).

The AFA 10 is designed to be installed in-series and to function in combination with an existing watering system, to apply a quantity of liquid fertilizer into a flowing stream of water exiting the watering system. A typical watering system 150, as shown in FIG. 1, consists of a water source 152 such as a utility water source, a water control valve 154 that can be operated manually or automatically by an electrically operated valve timer 156, and at least one sprinkler head 158. As also shown in FIG. 1, the AFA 10 is installed between the output of the water control valve 154 and the input of the at least one sprinkler head 158.

Figure 2:
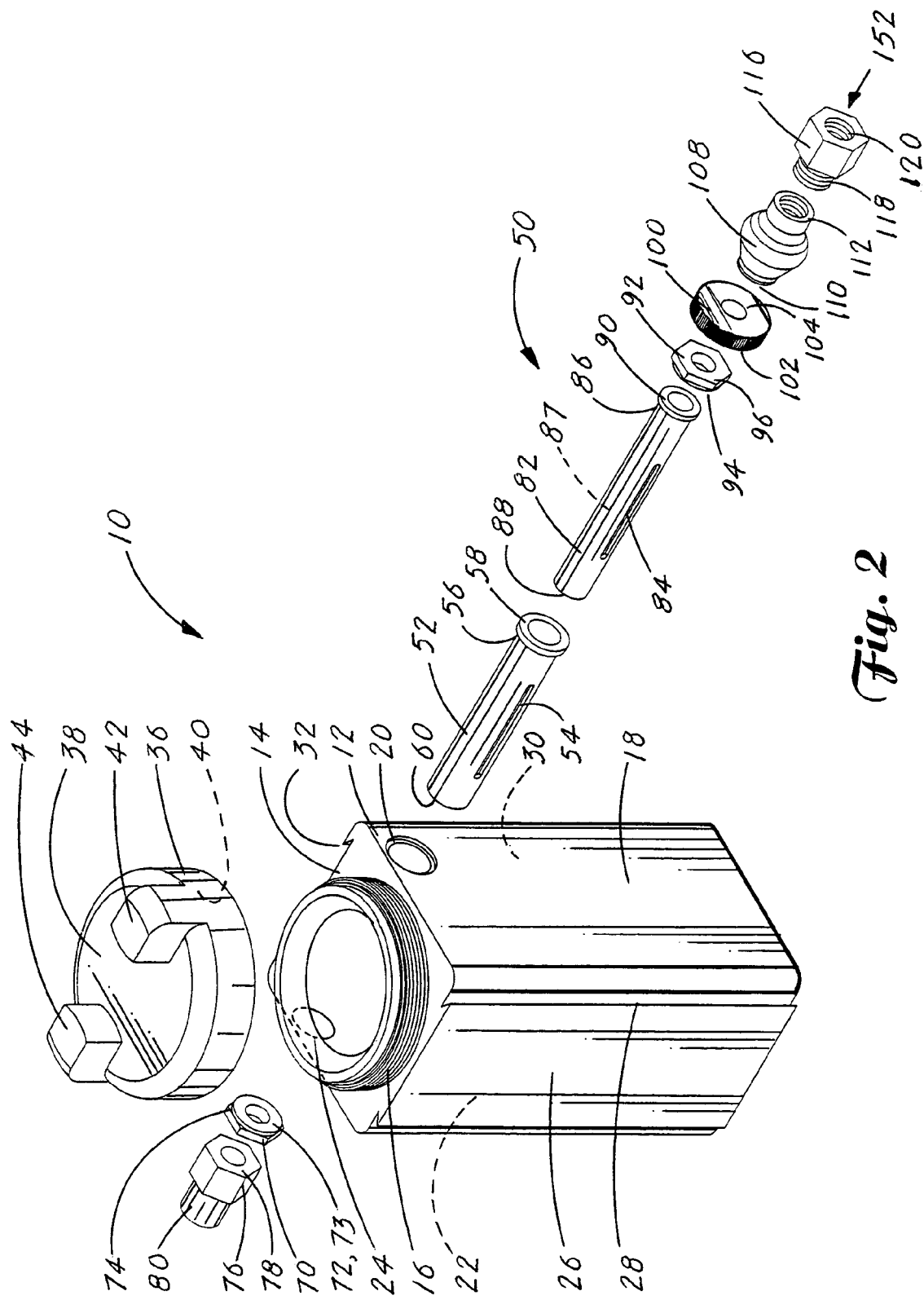
FIG. 2 is a perspective exploded view of the AFA.
Figure 3:
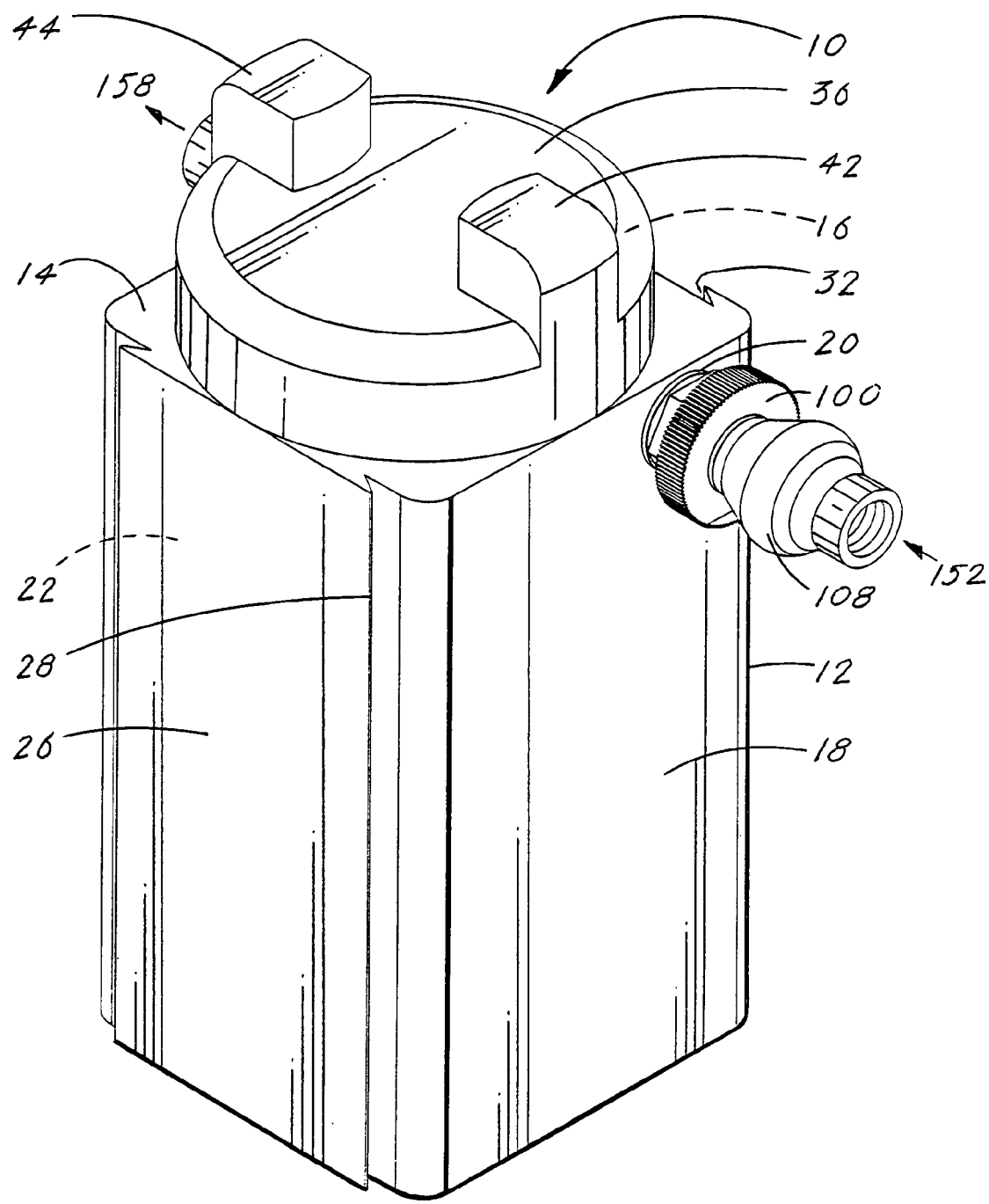
FIG. 3 is a perspective view of the AFA showing a first side, a third side and a container cap attached to a fertilizer container.
Figure 4:
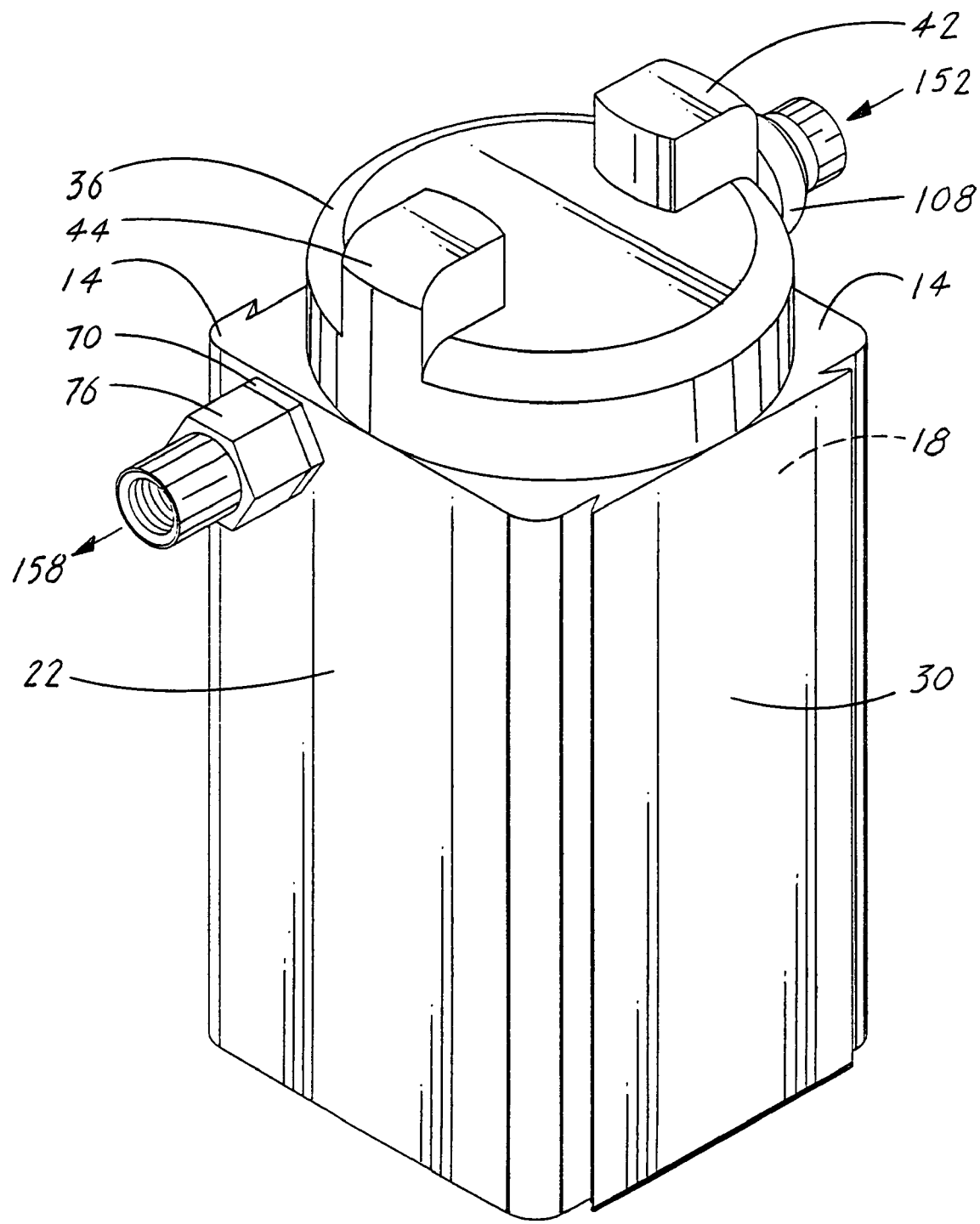
FIG. 4 is a perspective view of the AFA showing a second side, a fourth side and the container cap attached to the fertilizer container.
Figure 5:
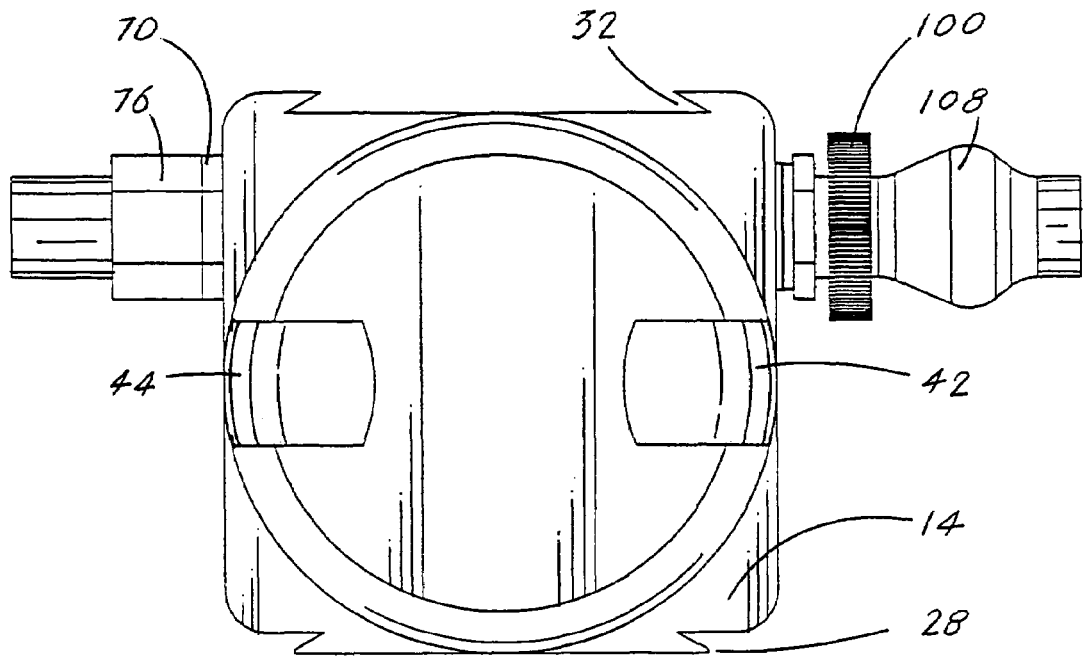
FIG. 5 is a top plan view of the AFA.
Figure 6:
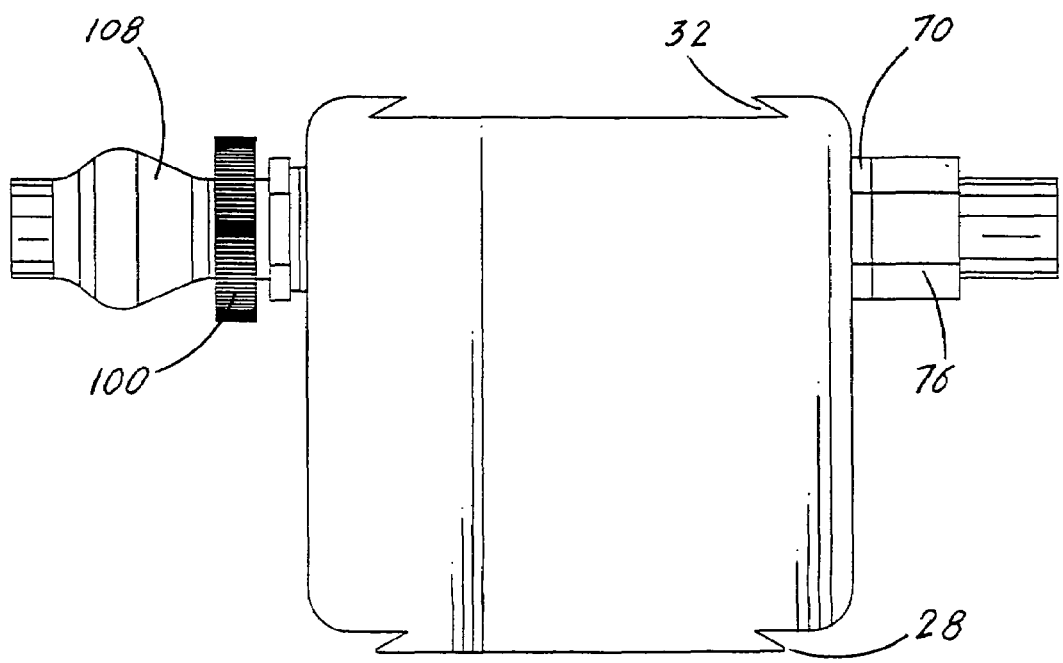
FIG. 6 is a bottom plan view of the AFA.
Figure 9:
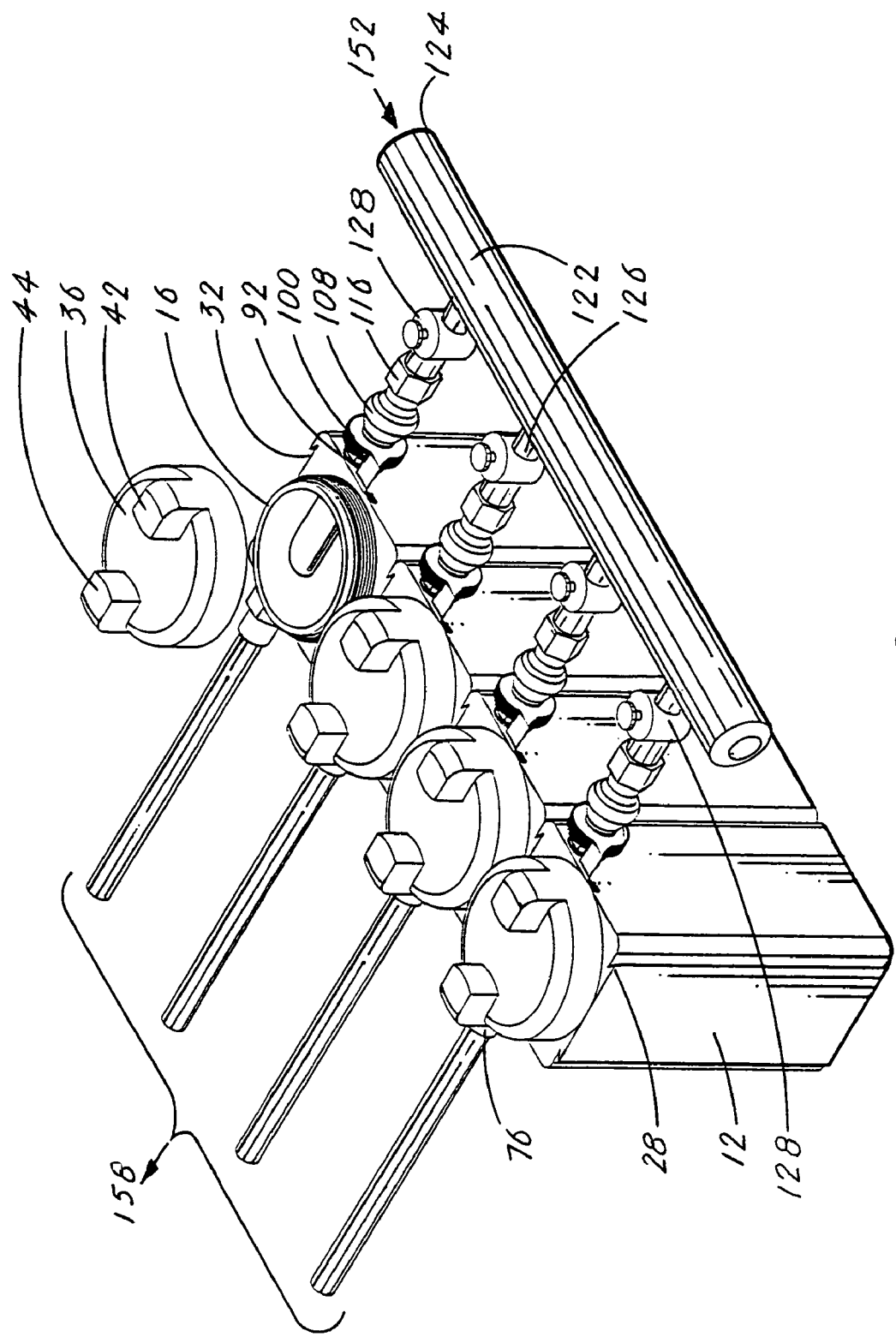
FIG. 9 is a perspective view showing four AFA's attached side-by-side and that have attached a water manifold connected to four fertilizer control assemblies.

The fertilizer container 12, as shown in FIGS. 2-6, has an upper surface 14 from where extends upward a threaded opening 16, as shown in FIG. 2. As also shown in FIGS. 2, 3 and 4, the fertilizer container 12 has a first side 18 that has a water inlet port 20, a second side 22 having a water/fertilizer output port 24, a third side 26 and a fourth side 30. The fertilizer container 12 can be dimensioned to hold between 0.5 to 5.0 gallons (1.9 to 18.9 liters) of liquid fertilizer. As shown in FIGS. 2, 3 and 4, the fertilizer container can also be designed to integrally include on the third side 26 an outward-extending dovetail section 28 and on the fourth side 30 an inward-extending dovetail section 32. The inward dovetail section 32 is dimensioned to accept the outward dovetail section 28 to allow at least two fertilizer containers 12 to be attached. In FIG. 9 are shown four fertilizer containers 12 attached side-by-side by means of the two dovetailed sections 28,32.

The container cap 36, is shown detached in FIGS. 2 and 9 and attached in FIGS. 3 and 4. The cap 36 has an upper surface 38 and a lower threaded section 40 that is dimensioned to be threaded into the threaded opening 16 on the fertilizer container 12. Preferably, as shown in FIGS. 3 and 4, the container cap 36 has integrally attached a first upward-extending protrusion 42 that is in alignment with a second upward-extending protrusion 44. The two protrusions allow the cap 36 to be easily grasped when removing or attaching the cap. The two protrusions also allow the shaft of a screwdriver to be angularly placed across the two protrusions 42,44. The shaft allows additional torque to be applied to loosen container caps that require additional force to open.

Figure 7:
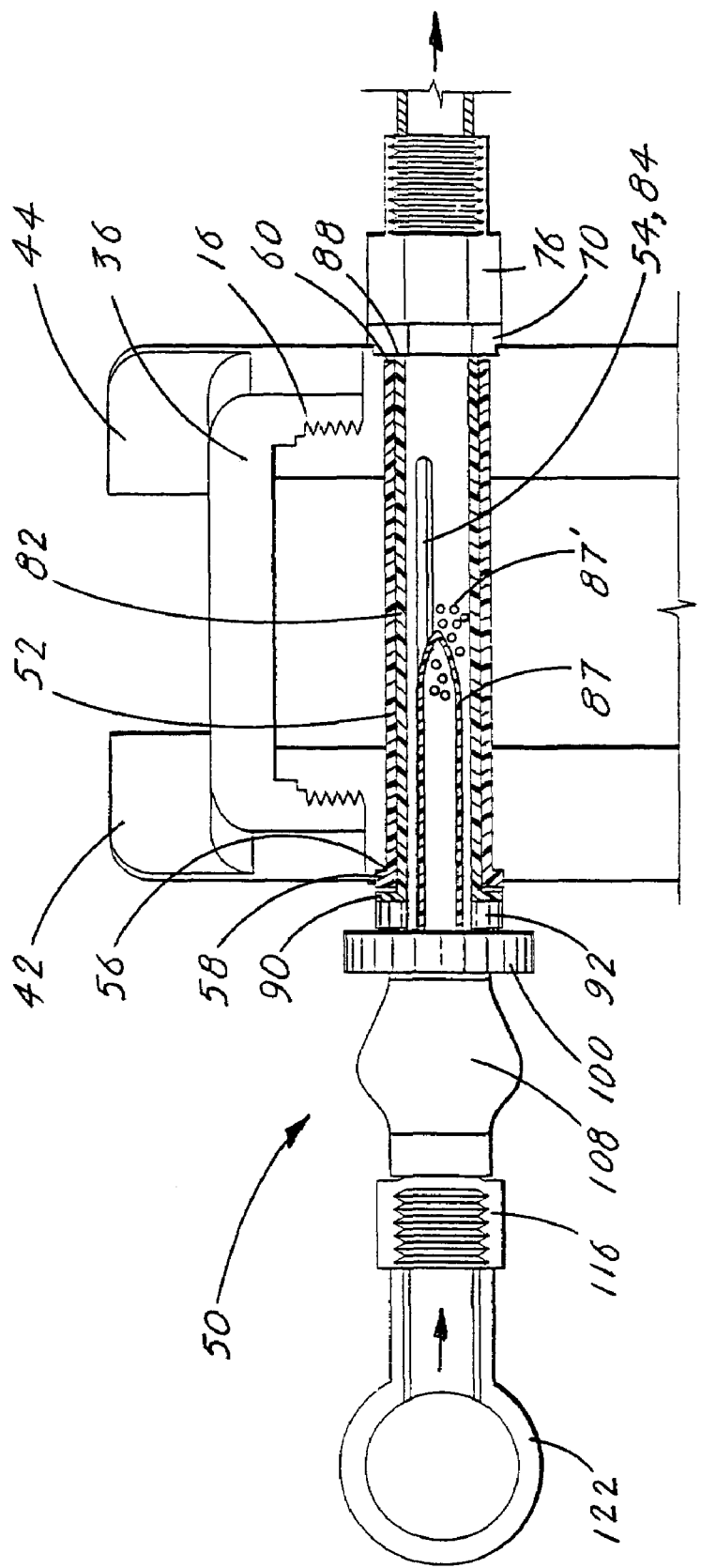
FIG. 7 is a side-elevational and partial cross-sectional view of a fertilizing control assembly inserted through the fertilizer container.

The third major element comprising the AFA 10 is the fertilizing control assembly 50 that functions to control the amount of liquid fertilizer that is applied into the flowing stream of water. The assembly 50, as shown in an exploded view in FIG. 2, and in a side-elevational and partial cross-sectional view in FIG. 7, is comprised of two subassemblies: an outer fertilizer control tube 52 and an inner fertilizer control tube 82.

The outer fertilizer control tube 52 includes an outer fertilizer entry slot 54, an inlet end 56 having an outward-extending circumferential lip 58, and an outlet end 60 that is not attached. The tube 52 is dimensioned to be frictionally inserted through the water inlet port 20. When inserted, the circumferential lip 58 is attached by the attachment means 64, to the first side 18 of the fertilizer container 12 surrounding the water inlet port 20.

The inner fertilizer control tube 82 which is dimensioned to rotatably fit into the outer fertilizer control tube is comprised of the following six major elements: an outlet locknut 70, a sprinkler tube adapter nut 76, a vortex tube 87, a fertilizer metering control knob 100, a back flow control valve 108 and a rotating union 116.

The inner fertilizer control tube 82, as best shown in FIG. 2, includes an inner fertilizer entry slot 84, an inlet end 86 and an outlet end 88. The inlet end further has an outward-extending circumferential lip 90 that rotatably interfaces with the outward-extending circumferential lip 58 on the outer fertilizer control tube. The internally attached vortex tube 87, as shown in FIG. 7, is located to overlap a portion of the inner fertilizer slot 84. When a stream of water flows through the inner fertilizer control tube 82 the water also flows around and through the vortex tube 87 as depicted by the water droplets 87' as also shown in FIG. 7. The vortex tube 87 functions as an aspirator to create a negative pressure that in turn, causes the liquid fertilizer in the fertilizer container to be drawn sequentially through the outer and inner fertilizer entry slots 54,84 and into the flowing stream of water passing through the fertilizing control assembly 50. Both the outer and inner entry slots 54,84 are each comprised of at least one longitudinal slot.

The inlet locknut 92 has an inner surface 94 and an outer surface 96. The inner surface 94 is fixedly attached by the attachment means to the circumferential lip 90 on the inlet end 86 of the inner fertilizer control tube 82.

Figure 8:
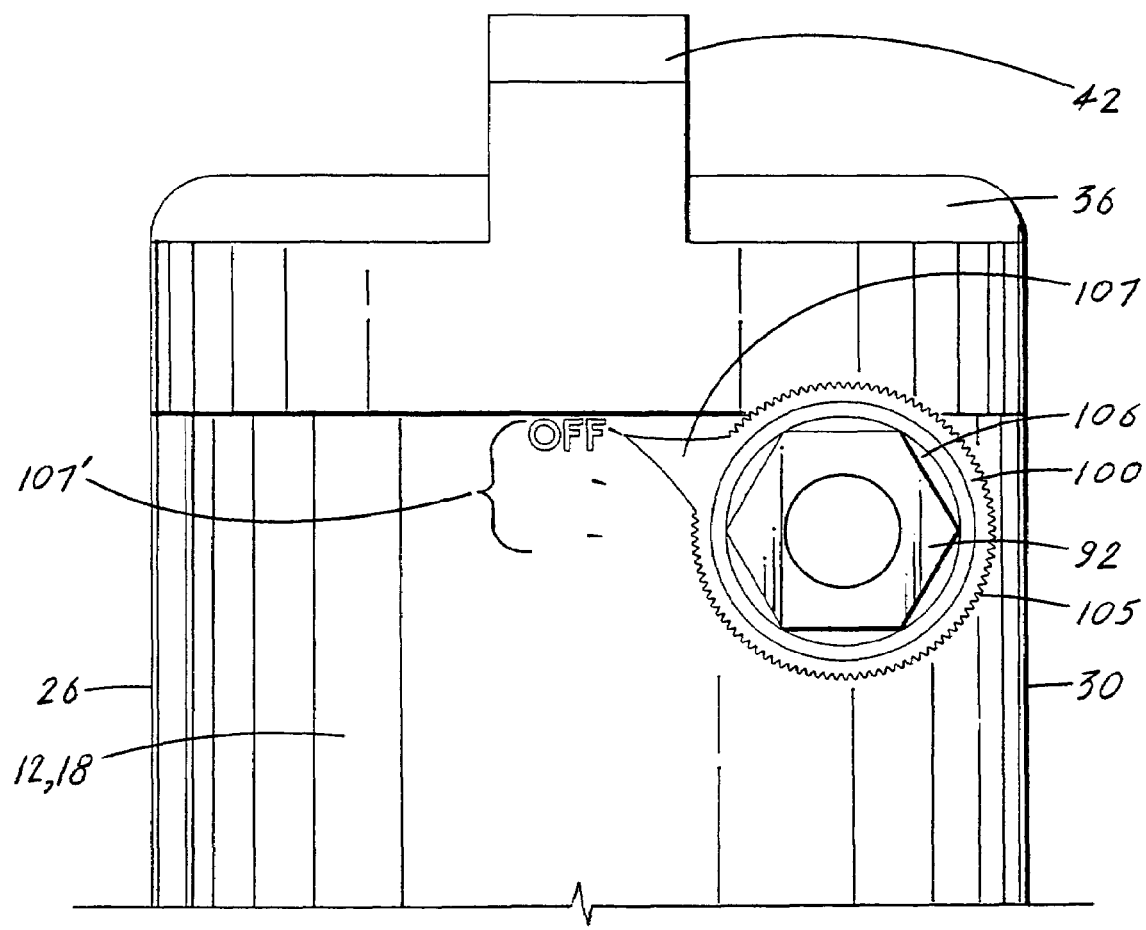
FIG. 8 is a partial elevational view showing the details of a fertilizer metering control knob that includes a pointer that interfaces with an off, a partial open, and a fully open position printed on the side of the fertilizer container.

The fertilizer metering control knob 100 has an inner surface 102 and an outer surface 104. The inner surface 102 is fixedly attached by the attachment means 64 to the outer surface of the inlet locknut 92. Alternatively, the knob 100 can be made with an opening 106, as shown in FIG. 8, that allows the knob 100 to be frictionally inserted over the inlet locknut 92. Additionally, as shown in FIG. 8, the knob 100 can be designed to include an outer knurled surface 105 and a pointer 107 that points to a scale 107' that is printed adjacent to the pointer 107 on the first side 18 of the fertilizer container 12, as also shown in FIG. 8. The scale 107' provides an indication of the quantity of liquid fertilizer that is being applied into the flowing stream of water.

The back flow control valve 108, which functions as a check valve, has an inner surface 110 and a female threaded outer section 112. The inner surface 110 is fixedly attached by the attachment means 64 to the outer surface 104 of the fertilizer metering control knob 100.

The final element that is attached to the water inlet end 86 of the inner fertilizer control tube 82 is the rotating union 116. The union 116 has a male threaded inner section 118 and an outer female threaded end 120. The male threaded inner section 118 is threaded into the female threaded outer section 112 of the back flow control valve 108. The outer female threaded end 120 is attached to a water line that is connected via the water control valve 154 to the water source 152, as shown in FIG. 1. As shown in FIG. 9, a water inlet manifold 122 having a single water inlet port 124 and a plurality of manifold outlet ports 126 can be utilized. In this design, the outlet ports 126 are dimensioned to be attached to a corresponding number of rotating unions 116 that are attached, as previously designed, to a like number of inner fertilizer control tubes 82. Alternatively, as shown in FIG. 9, a shut-off valve 128 can be located between each manifold outlet port 126 and the corresponding rotating union 116. The shut-off valves 128 allow each fertilizer container 12 to be individually operated.

To the outlet end 60 of the inner fertilizer control tube 82, as shown in FIGS. 2 and 7, is attached the outlet locknut 70 and the sprinkler tube adapter nut 76. The outlet locknut 70 has an inner surface 72 and an outer surface 74. The inner surface 72 in a first design, has a flat surface that is attached by the attachment means 64 to the outlet end 88 of the inner fertilizer control tube 82. In a second design the outlet locknut 70 further comprises an inward protrusion 73 that adds structural integrity and that is dimensioned to rotatably fit into the water/fertilizer output port 24 located on the second side 22 of the fertilizer container 12.

The final element is the sprinkler tube adapter nut 76 that has an inner surface 78 and an outer female threaded section 80. The inner surface 78 is attached by an attachment means 64 to the outer surface 74 of the outlet locknut 70. The outer female threaded section 80 is attached to a water line connected to the at least one sprinkler head 158.

While the invention has been described in complete detail and pictorially shown in the accompanying drawings it is not to be limited to such details, since many changes and modifications may be made to the invention without departing from the spirit and the scope thereof. For example, the AFA 10 can be designed to be placed underground or above ground can be color coded to indicate the liquid capacity of the fertilizer container and can include a transparent window on the container 12 to show the quantity of fertilizer remaining in the container 12. Hence, it is described to cover any and all modifications and forms, which may come within the language and cope of the claims.

The invention claimed is:

1. An automatic fertilizing apparatus that functions in combination with an existing watering system consisting of a water source connected in series with a water control valve and at least one sprinkler head, wherein said apparatus is installed between the output of the water source or the water control valve and the input of the at least one sprinkler head, said apparatus comprising:
   a) at least one fertilizer container containing liquid fertilizer and having an upper surface from where extends upward a threaded opening, a first side having a water inlet port, a second side having a water/fertilizer outlet port, a third side and a fourth side,
   b) a container cap having an upper surface and a lower threaded section that is dimensioned to be threaded into the threaded opening on said container,
   c) a fertilizer control assembly comprising:
      (1) an outer fertilizer control tube having an outer fertilizer entry slot, an inlet end having an outward-extending circumferential lip, and an outlet end that is not attached, wherein said tube is dimensioned to be frictionally inserted through the water inlet port with the circumferential lip attached by an attachment means, to the first side of said container surrounding the water inlet port,
      (2) an inner fertilizer control tube that is dimensioned to rotatably fit into said outer fertilizer control tube, said inner fertilizer control tube having:
         (a) an inner fertilizer entry slot, an inlet end and an outlet end with the inlet end having an outward-extending circumferential lip that rotatably interfaces with the outward-extending circumferential lip on said outer fertilizer control tube,
         (b) an internally attached vortex tube located to overlap a portion of the inner fertilizer entry slot, wherein when a stream of water flows through said inner fertilizer control tube the water also flows around and through the vortex tube that functions as an aspirator that creates a negative pressure that causes the liquid fertilizer in said fertilizer container to be drawn sequentially through the outer and inner fertilizer entry slots and into the flowing stream of water passing through said fertilizing control assembly,
         (c) an inlet locknut having an inner surface and an outer surface, wherein the inner surface is fixedly attached by an attachment means to the circumferential lip on the inlet end of said inner fertilizer control tube,
         (d) a fertilizer metering control knob having an inner surface and an outer surface, wherein the inner surface is fixedly attached by the attachment means to the outer surface of the inlet locknut,
         (e) a back flow control valve having an inner surface and a female threaded outer section, wherein the inner surface is fixedly attached by the attachment means to the outer surface of the knob, (f) a rotating union having a male threaded inner section that threads into the female threaded outer section of the back flow control valve, and an outer female threaded end that attaches to a water line connected to the water source, (g) an outlet locknut having an inner surface and an outer surface wherein the inner surface is attached by the attachment means to the outlet end of said inner fertilizer control tube, and (h) a sprinkler tube adapter nut having an inner surface that is attached by the attachment means to the outer surface of the outlet locknut, and an outer female threaded section that attaches to a water line connected to the at least one sprinkler head.

2. The apparatus as specified in claim 1 wherein said fertilizing metering control knob is further comprised of a knurled control knob that includes a pointer that interfaces with a scale printed on the first side of said fertilizer container.

3. The apparatus as specified in claim 1 wherein said fertilizer container is dimensioned to hold between 0.5 to 5.0 gallons (1.9 to 18.9 liters) of liquid fertilizer.

4. The apparatus as specified in claim 1 wherein said fertilizer container further comprises on the third side an outward-extending dovetail section and on the fourth side an inward-extending dovetail section, wherein the inward dovetail section is dimensioned to accept the outward dovetail section, thus allowing at least two said fertilizer containers to be attached.

5. The apparatus as specified in claim 1 wherein said container cap further comprises on the upper surface, a first upward-extending protrusion that is in alignment with a second upward-extending protrusion.

6. The apparatus as specified in claim 1 wherein the outlet locknut further comprises an inward protrusion that is dimensioned to rotatably fit into the water/fertilizer output port located on the second side of said fertilizer container.

7. The apparatus as specified in claim 1 wherein the outer and inner fertilizer entry slots are each comprised of at least one longitudinal slot.

8. The apparatus as specified in claim 1 wherein the fertilizer metering control knob further comprises an outer knurled surface.

9. The apparatus as specified in claim 8 wherein the fertilizer metering control knob further comprises a pointer that points to a scale printed adjacent the pointer on the first side of said fertilizer container, wherein the scale provides an indication of the quantity of fertilizer that is being applied into the flowing stream of water.

10. The apparatus as specified in claim 1 wherein said attachment means is comprised of an adhesive.

11. The apparatus as specified in claim 1 further comprising a water manifold having a single water inlet port and a plurality of manifold outlet ports that are dimensioned to be attached to a corresponding number of rotating unions attached to a like number of inner fertilizer control tubes connected to said fertilizer containers.

12. The apparatus as specified in claim 11 further comprising a shut-off valve located between each of the manifold outlet ports and the corresponding rotating union, wherein said shut-off valves allow each said fertilizer container to be individually operated.

* * * * *